United States Patent [11] 3,627,919

[72] Inventors Irving Roth
 Williston Park;
 Edward W. Stark, Garden City; Solomon
 A. Zadoff, Jericho, all of N.Y.
[21] Appl. No. 877,719
[22] Filed Nov. 18, 1969
[45] Patented Dec. 14, 1971
[73] Assignee Sperry Rand Corporation

[54] CODED RETICLE CATHODE-RAY TUBE CORRELATOR APPARATUS
 11 Claims, 2 Drawing Figs.
[52] U.S. Cl. .................................................... 178/6.8,
 250/217 CR, 356/172
[51] Int. Cl. ....................................................... H04n 5/14
[50] Field of Search ............................................ 178/6.8;
 250/217 CR; 356/152, 172

[56] References Cited
UNITED STATES PATENTS

| | | | |
|---|---|---|---|
| 2,966,544 | 12/1960 | Gargini.......................... | 178/5.4 |
| 3,008,372 | 11/1961 | Willey et al..................... | 178/6.7 X |
| 3,303,273 | 2/1967 | Williams et al. ................ | 178/5.4 |
| 3,497,239 | 2/1970 | Buhrer .......................... | 250/217 CR |
| 3,521,075 | 7/1970 | Bulfer........................... | 178/6.7 X |

Primary Examiner—Robert L. Griffin
Assistant Examiner—Richard K. Eckert, Jr.
Attorney—S. C. Yeaton ABSTRACT: An optical correlator object detecting and locating apparatus comprising a first rotatable reticle disposed in an optical receiver for uniquely encoding incident radiation in accordance with the location of the radiating object in the field of the receiver, the encoded signal being applied to a cathode-ray tube wherein it modulates the intensity of an electron beam which is swept vertically at a rate corresponding to the rotational rate of the reticle and horizontally at a rate determined by the reticle code pattern. A second reticle identically coded and synchronously rotated with the first reticle is positioned adjacent the cathode-ray tube screen whereupon spatial image correlation occurs at the instant the second reticle is aligned with the code pattern on the screen causing maximum light (the autocorrelation signal) to be transmitted through the second reticle. A visual presentation of the location of the radiating object in the field is obtained by means of an additional cathode-ray tube which is swept similarly to the first cathode-ray tube and intensity modulated by the correlation signal.

INVENTORS
IRVING ROTH
EDWARD W. STARK
SOLOMON A. ZADOFF
BY

ATTORNEY

CODED RETICLE CATHODE-RAY TUBE CORRELATOR APPARATUS

BACKGROUND OF THE INVENTION

1. Field of the Invention

The present invention relates to optical correlators and more particularly to means for increasing the dynamic range of certain types of correlators, that is, the range in which a proportional relationship exists between input and output signals. This feature of a correlator apparatus is especially significant in object detecting and locating systems where a plurality of objects are likely to be present in the field simultaneously or where it is desired to form an image of an extended (nonpoint source) object, the latter being regarded as a multiplicity of contiguous point sources.

It is well understood by those skilled in the art that correlation involves the multiplication of functions and integration of the resultant product. In the case of optical correlators used for object detection and location, the integration is frequently performed by a vidicon or other apparatus having a light-sensitive storage medium capable of rapid readout and erasure whereby real time operation is readily attained. A vidicon, however, has limited dynamic range in that the output signal saturates for comparatively low levels of light intensity impinging on the photosensitive element. Consequently, a vidicon is not particularly suitable as an integrating device for applications in which the light intensity is likely to be at a high level in either certain regions or over the entire area of the photosensitive element. High light levels are caused by various conditions such as a field having a generally bright background or the simultaneous presence of a plurality of radiating objects in an otherwise dark field. In addition, the correlator itself may require a high quiescent operating light level. The latter limitation exists, for example, in the apparatus disclosed in U.S. Pat. application Ser. No. 718,751, filed Apr. 4, 1968 in the name of Stephen G. McCarthy et al. and assigned to the assignee of the present invention.

2. Description of the Prior Art

The McCarthy et al. application discloses an encoding and correlating apparatus comprising two disc-shaped spatially aligned and identically coded synchronously rotating reticles each having a plurality of concentric annular bands with the same pseudo-random code inscribed thereon by respective transparent and opaque segments. One of the reticles is positioned at the focal plane of a receiver lens so that upon rotating about an axis normal to the plane of the disc the incident radiant energy is intensity modulated. The code in each annular band is shifted relative to the contiguous bands by an amount equal to the width of the field and a sufficient number of bands is used so that the field contains a complete code. A stop located adjacent the reticle intermediate the reticle and receiver lens defines the areal dimensions of the field. Since one complete code lies within the receiver field, the energy is uniquely encoded in accordance with its position in the focal plane which in turn depends upon the location of the object in the field of view. The encoded energy in turn is directed to a photodetector wherein it is converted to an equivalent electrical signal. Visual readout of the object's location in the field or a presentation of an image of the object is then obtained by correlating the encoded electrical signal with a plurality of phase-shifted replicas of the encoded signal. The multiplication aspect of the correlation process is accomplished by applying the encoded electrical signal to the drive terminal of a glow modulator which illuminates an area of the second reticle corresponding to the field area defined on the first reticle. A light-sensitive storage medium positioned behind the second reticle performs the integration function. As explained in the McCarthy et al. application, the foregoing arrangement provides a correlation function which is devoid of residues and thus eliminates ambiguities. In that invention a vidicon is used as the integrating element in order to obtain rapid readout and erasure of the information stored therein. An updated visual indication of the field is obtained simply by scanning the vidicon storage element to obtain an output signal which in turn modulates the electron beam of a cathode-ray tube that is swept in synchronism with the vidicon readout signal.

As previously mentioned, the dynamic range of a vidicon is limited because its storage element tends to saturate at low levels of light intensity. It will be appreciated that this is a serious limitation when a plurality of objects are present in the field simultaneously, each of which is uniquely encoded and operative to drive the glow modulator. Moreover, the condition is aggravated if the storage element is not erased at the end of each code period (reticle revolution) but instead is permitted to accumulate for two or more periods for the purpose of increasing the signal-to-noise ratio. In addition, since the encoded electrical signal provided at the photodetector output is generally of very small amplitude, it is essential for it to be coupled to the glow modulator through an amplifier. In the case of a DC amplifier, the glow modulator can be operated in a normally off condition and then flashed on only in response to the positive-going encoded electrical signal. AC amplifier coupling is preferred, however, to eliminate the drift inherent in DC amplifiers. In the case of AC coupling though the glow modulator must be operated at a quiescent level above zero to assure that the simultaneous occurrence of two negative-going signals produced by two discrete objects in the field does not provide a resultant negative signal to the glow modulator. This will be understood by momentarily considering two signals of equal amplitude one varying at a rate twice that of the other. Two such signals will combine at one instant to produce a signal having a magnitude double that of either signal, at another instant to provide a resultant signal of zero and at still another instant to produce a negative resultant. Consequently, if the glow modulator is not biased to a sufficient quiescent level, both the zero and the negative resultant signals will be effective to turn off the glow modulator and thereby impair the correlation process.

SUMMARY OF THE INVENTION

The foregoing limitations of the apparatus described in the McCarthy et al. application are overcome in the present invention by the provision of a cathode-ray tube which is used in place of the glow modulator and vidicon. Thus, after the incident radiant energy is encoded and converted to an equivalent electrical signal it is applied to the Z-axis of a cathode-ray tube. Sweep signals are simultaneously applied to the X- and Y-axis input terminals of the cathode-ray tube. The combination of signals applied to the three axes operate to form a code pattern on the screen of the cathode-ray tube, the pattern being representative of the encoded electrical signal. In the case of a single point source object radiating energy onto the encoding reticle, the cathode-ray tube pattern will be a replica of the reticle code shifted in accordance with the location of the object in the field. The foregoing statement will be more clearly understood after reading the subsequent detailed Description of the Preferred Embodiment. A second reticle, identically coded with the first (encoding) reticle and referred to in the subsequent Description of the Preferred Embodiment as a decoding reticle for convenience of distinction is positioned adjacent the screen of the cathode-ray tube to perform the correlation. It will be appreciated that if the cathode-ray tube pattern is a phase shifted replica of the encoding reticle pattern, then as the decoding reticle rotates the code inscribed thereon will move into spatial coincidence with the cathode ray tube pattern once during each revolution. At the instant of spatial coincidence maximum light energy will be transmitted through the decoding reticle thereby signifying correlation. The correlation is therefore performed spatially as compared to the more conventional temporal correlation techniques. Moreover, use of a cathode-ray tube for displaying the encoded data enables the correlation to be performed in real time. Presentation of the correlation signal as an indication of object location in the field is provided by utilizing the correlation signal to modulate the beam intensity of an additional cathode-ray tube which is swept in synchronism with the tube on which the phase-shifted code pattern is formed.

DESCRIPTION OF THE PREFERRED EMBODIMENTS

Figure 1:
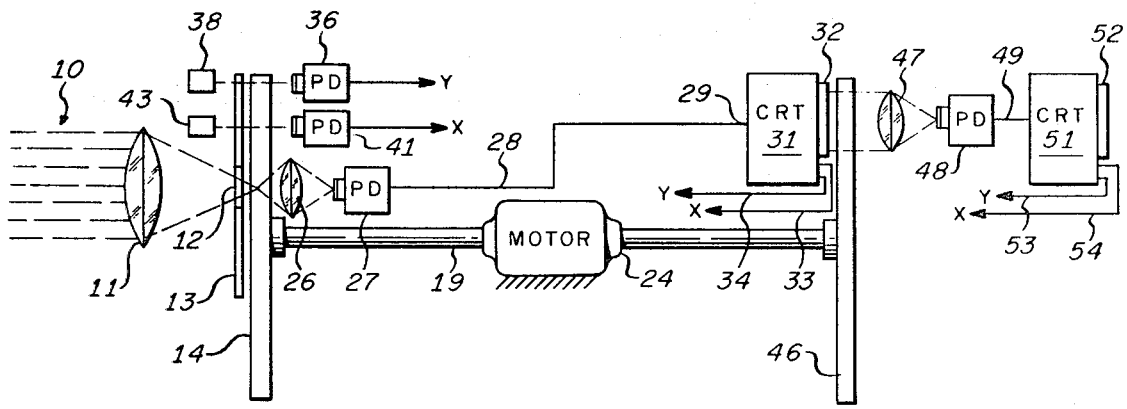
FIG. 1 is a block diagram of a preferred embodiment of the invention.
Figure 2:
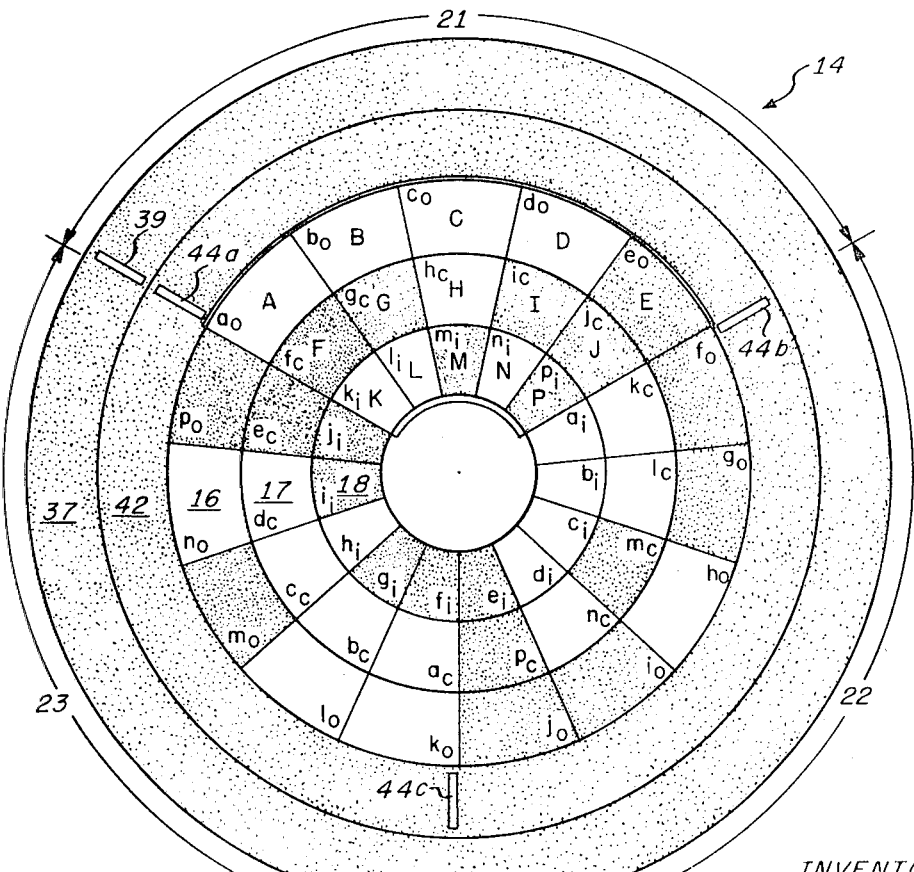
FIG. 2 is a facial view depicting the code pattern formed on the reticles used in the embodiment of FIG. 1.

Referring to FIG. 1, light rays 10 radiated from a remote object onto input lens 11 are focused through aperture 12 in stop 13 onto encoding reticle 14 at a position determined in accordance with the location of the object in the field of the input lens. The reticle code pattern, depicted in FIG. 2, is formed by arcuate segments which are respectively transparent (clear) and opaque (dark) to radiation in the waveband of interest, perhaps extending throughout the optical spectrum from the infrared into the ultraviolet or alternatively being restricted to any prescribed band in that range. As in the apparatus of the aforementioned McCarthy et al. application, the same pseudo-random code is formed in bands 16, 17 and 18 and the code in each band is shifted relative to the contiguous bands by an amount equal to the width of the field as defined by the aperture in stop 13. Thus, in the case of the 15--bit code selected for illustration, code bit $a_o$ in outer band 16 is shifted by five bits relative to code bit $a_c$ in central band 17 and by ten bits relative to code bit $a_i$ in inner band 18. A sufficient number of annular bands is provided so that each of the reticle sections 21, 22 and 23, corresponding to the outline of the field formed by the stop, contains a complete code. In actual practice, the code length is chosen so that the number of bits in the code exactly or very nearly matches the number of resolution elements desired in the field. In addition, the individual code bits are preferably made sufficiently small and the reticle large enough so that the field is substantially square or rectangular rather than curved as indicated in the figure.

The reticle is rotated in the focal plane of the input lens by shaft 19 connected to motor 24, thus causing the radiation incident on the reticle to be modulated in accordance with the transparency and opacity of the successive bits intercepting the radiation incident thereon. Since a discrete code bit occupies a given position in the field at any instant, rotation of the reticle will encode the incident radiation with a unique time delay determined by the location of the object in the field. Lens 26 positioned behind the encoding reticle collects the modulated energy and directs it onto photodetector 27 which provides a correspondingly modulated electrical signal on its output lead 28 which is coupled to Z-axis input terminal 29 of CRT 31 whereat the encoded signal operates to intensity modulate an electron beam which is swept in two dimensions on screen 32 under the control of signals applied to the X-input terminal 33 and Y-input terminal 34. The signal applied to the Y input terminal is derived from photodetector 36 which is positioned adjacent band 37 of encoding reticle 14 on the side opposite from pinlight source 38. Band 37 is opaque throughout its length except for transparent radial segment 39. As this transparent segment passes between light source 38 and photodetector 36, an electrical signal is applied to the cathode-ray tube Y-axis input terminal whereupon the electron beam directed onto screen 32 commences a vertical sweep which terminates and begins a new sweep at the next instant that transparent segment 39 rotates into alignment with the light source and photodetector. Thus, the cathode-ray tube beam is swept vertically once for each revolution of the reticle. During each vertical sweep of the beam, a plurality of signals are applied to the cathode ray tube X-axis input terminal causing the beam to sweep horizontally in a plurality of discrete vertically displaced sweeps. These signals are derived from photodetector 41 which is positioned adjacent band 42 of encoding reticle 14 on the side opposite from pinlight source 43. Band 42 is also opaque throughout its length except for transparent radial segments 44a, 44b and 44c which are displaced about the band in alignment with coded reticle sections 21, 22 and 23. As previously mentioned, a reticle section having areal dimensions corresponding to the field of input lens 11 will generally have a rectangular shape. Hence, the combined horizontal and vertical deflections of the electron beam will form a similarly shaped pattern on the screen of the cathode ray tube. In any event, it will be appreciated by those skilled in the art that if the reticle pattern has a curved shape, respective transverse deflection signals can be made to operate in a manner to produce a corresponding pattern on the cathode ray tube screen.

Decoding reticle 46 positioned in front of screen 32 is identically coded with encoding reticle 14. The decoding reticle is also preferably spatially aligned with the encoding reticle and synchronously rotated therewith by motor 24. The spatial alignment and rotational rates of the respective reticles may be different, however, as will be explained subsequently. To provide a better understanding of exactly how the multiplication aspect of the correlation process is performed, consider the following example, Assume that light from a radiating object is focused on sector A, lying in the plane of encoding reticle 14, at the instant the reticle is positioned as shown in FIG. 2, that is, with segment $a_o$ coincident with sector A. At the moment transparent segments 39 and $44_n$ in bands 37 and 42 intercept the light beams from light sources 38 and 43, respectively, the electron beam directed to the screen of the cathode-ray tube 31 commences both the horizontal and vertical sweeps. Also, during the first horizontal sweep as the reticle rotates in a counterclockwise direction causing segments $a_o$ to $e_o$ to move successively past sector A, the electron beam is intensity modulated on and off in the following sequence ++++− (first horizontal sweep)

where "+" indicates on and " " indicates off. When radial segment $44_b$ of band 42 passes light source 43, a second horizontal sweep commences and during this interval code segments $f_o$ through $j_o$ move past sector A with the result that the electron beam on the cathode ray tube signal is modulated as follows:

−−+−− (second horizontal sweep)

Again, as segment $44_c$ passes light source 43 a third horizontal sweep commences in which the electron beam is modulated as follows by the segments $k_o$ to $p_o$ ++−+− (third horizontal sweep)

The screen on the cathode-ray tube is selected to have a fairly high degree of light retentivity so that the code pattern formed thereon in accordance with the first, second and third horizontal sweeps is similar to the code depicted in reticle section 21 of encoding reticle 14. Hence, on the next occurrence of segments $a_o$ through $e_o$ passing sector A the procedure is repeated assuming, of course, that radiant energy is still incident on sector A. Then, since decoding reticle 46 is identically coded and spatially aligned with reticle 14, a pattern on the decoding reticle matching the code pattern inscribed on the cathode-ray tube screen will rotate into spatial coincidence therewith during each revolution of the reticle whereupon maximum light energy will be transmitted from the screen through the decoding reticle onto lens 47 which focuses the light onto photodetector 48. Thus, at that instant, an electrical signal of large amplitude is provided at the output of photodetector 48 which is coupled by lead 49 to cathode-ray tube 51 wherein it modulates the intensity of an electron beam directed on screen 52, the beam being normally off but switched on in response to the modulation signal. The sweep signals applied to vertical deflection terminal 53 and horizontal deflection terminal 54 of the cathode-ray tube are the same as those applied to the corresponding terminals of cathode-ray tube 31. In this instance, though, the horizontal and vertical traces are both swept oppositely to the direction of sweep in cathode ray tube 31 to compensate for the spatial inversion caused by input lens 11 so that the presentation on screen 52 corresponds exactly to the field of view observed by the apparatus. Consequently, a bright spot appears on screen 52 in the lower right-hand corner corresponding to the location of the object in the field for the assumed condition of energy focused on sector A in the plane of encoding reticle 14.

From the foregoing description it should be apparent that the visual presentation of object location on screen 52 will vary in accordance with the location of the radiating object in the field. For instance, if the radiant energy is incident on sector F such that the code formed on screen 32 of cathode-ray tube 31 is generated during the first horizontal sweep by segments $f_c$ through $j_c$, during the second horizontal sweep by segments $k_c$ through $p_c$ and during the third horizontal sweep by segments $a_c$ to $e_c$, then matching decoding reticle and screen patterns will occur only when reticle section 22 moves into position in front of the screen. Hence, a modulating signal of sufficient amplitude to switch on the electron beam of cathode-ray tube 51 will not be produced until the beginning of the second sweep line thus demonstrating that the visual presentation of the object again coincides with the location of the radiating object in the field.

Although the invention has been described photodetector as performing the spatial areal correlation in real time, it should be understood that the invention can also be operated by placing a camera or other light-sensitive recording medium such as a photochromic material in the position of reticle 46 to obtain a permanent record of the pattern inscribed on the screen of cathode-ray tube 31. Then at any later time the decoding process can be performed by using the permanent record in combination with decoding reticle 46, photodetector 48 and cathode-ray tube 51. In this case the decoding reticle must still be identically coded with the encoding reticle but there is no requirement for spatial alignment or synchronous rotation.

Further, it should be understood, however, that it is not essential for the cathode-ray tube presentation to match or conform to that of the encoding reticle. As will become apparent from the subsequent descriptive material, the necessary requirement is that the configuration of the cathode-ray tube presentation must conform to the pattern of the decoding reticle positioned adjacent the face of the tube. Thus, the encoding reticle pattern could be presented on the tube, for example, in the form of an annular band or lineal strip or other desired arrangement. The decoding reticle then, instead of being identical to the encoding reticle, would be constructed to match the format on the screen of the cathode-ray tube.

The aforedescribed procedure can be equally applied to situations wherein more than one radiating object is present in the field at the same time. While the description is more involved the operation for one or more radiating points or entire scenes is the same as for a single radiating point. Moreover, as explained in the aforementioned McCarthy et al. application, since only a single code is employed on the reticles, cross-correlation is not performed and its attendant residues are therefore eliminated. In addition, since the codes are shifted in adjacent bands and the field arranged to coincide with the dimensions of the code shift in the manner described by McCarthy et al. autocorrelation residues are also eliminated. Thus ambiguities are avoided and the apparatus is rendered suitable for simultaneously detecting a plurality of discrete sources or for forming images of nonpoint sources.

We claim:
1. An optical encoding and display apparatus comprising
an encoding member including a plurality of continuous loop tracks each having the same pseudo-random code formed thereon, the code in each track being shifted relative to the adjacent tracks each having the same pseudo-random code formed thereon, the code in each track being shifted relative to the adjacent tracks and a sufficient number of tracks being provided so that a complete code is enclosed in a section comprising a partial length of each track in combination with a partial length of all the other tracks,
optical receiver means for focusing optical radiant energy onto said encoding member, said receiver means having a field of view corresponding to the areal dimensions of said section,
means for driving said encoding member so that discrete bits of the pseudo-random code successively intercept the radiant energy incident thereon,
photodetector means positioned to receive the encoded light transmitted through said encoding member and produce a correspondingly encoded electrical signal,
a cathode-ray tube including a light-emissive screen sensitive to electrons impinging thereon and means for generating an electron beam directed toward said screen, said tube being connected to said photodetector means to receive the encoded electrical signal provided thereby for modulating the intensity of said electron beam, and
means for controlling the direction of said modulated electron beam so as to provide a visual presentation of said encoded electrical signal on said screen.

2. The apparatus of claim 1 further including a decoding member having a code formed thereon identical to the code on said encoding member and positioned adjacent said screen, said code being disposed on said decoding member in a manner conforming to the format of the presentation on said screen whereby at the instant of spatial coincidence of the decoding member with the code presented on the screen of the cathode-ray tube a maximum light signal is transmitted through said decoding member,
an additional cathode-ray tube including a light-emissive screen and means for generating an electron beam directed toward said screen,
means for controlling the direction of the electron beam impinging on the screen of said additional cathode-ray tube, and
additional photodetector means responsive to the light transmitted through said decoding member and coupled to said additional cathode ray tube for modulating the intensity of the electron beam therein in accordance with the amplitude of the light signal transmitted through said decoding member to produce on said emissive surface a visual indication of the position of the radiating object in the field of the optical receiver.

3. An optical encoding and display apparatus comprising
an encoding member including a plurality of continuous loop tracks each having the same pseudo-random code formed thereon, the code in each track being shifted relative to the adjacent tracks and a sufficient number of tracks being provided so that a complete code is enclosed in a section comprising a partial length of each track in combination with a partial length of all the other tracks,
optical receiver means for focusing optical radiant energy onto said encoding member such that the focused energy is incident on a discrete bit of the code, said receiver means having afield of view corresponding to the areal dimensions of said section,
means for driving said encoding member so that successive bits of the pseudo-random code intercept the radiant energy incident thereon,
photodetector means positioned to receive the encoded light transmitted through said encoding member and produce a correspondingly encoded electrical signal,
a display mechanism having a light-emissive surface and modulating means for controlling the intensity of a display beam directed onto said surface and further including first and second sweep means for scanning the display beam in transversely oriented directions to produce a two dimensional display on said emissive surface in accordance with the modulation of said beam and time variation of signals applied to said sweep means
means for providing a signal to said first sweep means to scan the display beam in one direction for a first time interval equal to the time required for a complete code in one track to transverse the field of view commencing at the instant a given bit passes a predetermined point in space, means for providing a signal to said second sweep means to scan the display beam in a direction transverse to said one direction for a second time interval equal to the time required for a length of track through which the code is shifted to transverse the field of view, said second sweep means being operative to scan the display beam a multiplicity of times during each interval that it is scanned by said first sweep means, and means for coupling said photodetector means to the modulating means of said display mechanism to control the intensity of the display beam.

4. The apparatus of claim 3 wherein said means for providing a signal to said first sweep means of the display mechanism includes a first sweep signal source and a sensor disposed adjacent the encoding member, said sensor being responsive to and receiving a single signal from said first sweep signal source during a time interval equal to said first time interval; and said means for providing a signal to said second sweep includes means a second sweep signal source and a plurality of additional sensors disposed adjacent the encoding member, said additional sensors being responsive to and each receiving one signal from said second sweep signal source during time interval equal to said first time interval.

5. The apparatus of claim 3 wherein the pseudo-random code in each track of said encoding member is formed by segments which are respectively relatively more transparent and opaque to optical radiant energy.

6. The apparatus of claim 5 wherein said optical receiver means includes an input lens and a mask positioned adjacent said encoding member in noncontacting relation therewith, said mask having an aperture conforming to the shape of a section of said encoding member and each track of said encoding member including exactly one code length.

7. The apparatus of claim 3 further including
an additional encoding member identically coded and driven in synchronism with said encoding member, said additional encoding member being positioned relative to said display mechanism such that light energy emitted from the code pattern on the emissive surface thereof and transmitted through the additional encoding member is a maximum at the instant that a code pattern on the additional encoding member is spatially coincident with an identical code pattern on said display means,
an additional display mechanism having a light-emissive surface, first and second sweep means and modulating means operative in the same manner as said display mechanism, and
additional photodetector means responsive to the light transmitted through said additional encoding member and coupled to the modulating means of said additional display mechanism for producing on the emissive surface thereof a visual indication of the position of the radiating object in the field of the optical receiver.

8. The apparatus of claim 7 wherein the pseudo-random code in each track of both of the encoding members is formed by segments which are respectively relatively more transparent and opaque to optical radiant energy and each track of the encoding members includes exactly one code length.

9. The apparatus of claim 8 wherein said optical receiver means includes an input lens and a mask positioned adjacent said encoding member in noncontacting relation therewith, said mask having an aperture conforming to the shape of a section of said encoding member.

10. The apparatus of claim 9 wherein said means for providing a signal to said first sweep means of both of the display mechanisms includes a first sweep signal source and a sensor disposed adjacent one of the encoding members, said sensor being responsive to and receiving a single signal from said first sweep signal source during a time interval equal to said first time interval; and said means for providing a signal to said second sweep means includes a second sweep signal source and a plurality of additional sensors disposed adjacent one of the encoding members, said additional sensors being responsive to and each receiving one signal from said second sweep signal source during a time interval equal to said first time interval.

11. The apparatus of claim 10 wherein the encoding members are disc-shaped reticles rotatable about an axis oriented normal to the plane of said reticles and both of the photodetector means each include a lens for collecting the light transmitted through the encoding members.

* * * * *